United States Patent [19]

Slater

[11] Patent Number: 5,408,318
[45] Date of Patent: Apr. 18, 1995

[54] WIDE RANGE STRAIGHTNESS MEASURING STEM USING A POLARIZED MULTIPLEXED INTERFEROMETER AND CENTERED SHIFT MEASUREMENT OF BEAM POLARIZATION COMPONENTS

[75] Inventor: Dan Slater, La Habra Heights, Calif.

[73] Assignee: Nearfield Systems Incorporated, Carson, Calif.

[21] Appl. No.: 101,226

[22] Filed: Aug. 2, 1993

[51] Int. Cl.⁶ .............................................. G01B 9/02
[52] U.S. Cl. .................................. 356/351; 356/349; 356/358
[58] Field of Search ............... 356/351, 363, 349, 358, 356/357, 345

[56] References Cited

U.S. PATENT DOCUMENTS

| | | |
|---|---|---|
| 3,692,413 | 9/1972 | Marcy et al. . |
| 4,062,634 | 12/1977 | Rando et al. . |
| 4,170,401 | 10/1979 | Yoder, Jr. et al. ................... 356/138 |
| 4,261,107 | 4/1981 | Coleman et al. ..................... 356/358 |
| 4,360,271 | 11/1982 | Downs et al. ......................... 356/351 |
| 4,377,036 | 3/1983 | Dangschat ............................ 356/358 |
| 4,512,661 | 4/1985 | Claus et al. . |
| 4,558,950 | 12/1985 | Ulrich et al. ......................... 356/351 |
| 4,563,091 | 1/1986 | Dandliker . |
| 4,621,926 | 11/1986 | Merry et al. ......................... 356/363 |
| 4,676,598 | 6/1987 | Markley . |
| 4,684,828 | 8/1987 | Sommargren . |
| 4,688,940 | 8/1987 | Sommargren et al. . |
| 4,693,606 | 9/1987 | Podolsky et al. . |
| 4,710,026 | 12/1987 | Magome et al. . |
| 4,717,250 | 1/1988 | Sommargren . |
| 4,733,967 | 3/1988 | Sommargren . |
| 4,746,216 | 5/1988 | Sommargren . |
| 4,752,133 | 6/1988 | Sommargren . |
| 4,787,747 | 11/1988 | Sommargren et al. . |
| 4,807,997 | 2/1989 | Sommargren . |
| 4,816,744 | 3/1989 | Papurt et al. ........................ 356/358 |
| 4,950,878 | 8/1990 | Ulich et al. .......................... 356/354 |
| 4,984,891 | 1/1991 | Miyazaki et al. . |
| 5,064,289 | 11/1991 | Bockman ............................. 356/351 |
| 5,305,089 | 4/1994 | Hosoe .................................. 356/351 |

OTHER PUBLICATIONS

Self-Calibrating Surface Measuring Machine by Allen H. Greenleaf, Optical Engineering, Mar.-Apr. 1983, vol. 22, No. 2, pp. 276-280.

*Primary Examiner*—Samuel A. Turner
*Assistant Examiner*—Russell C. Wolfe
*Attorney, Agent, or Firm*—Graham & James

[57] ABSTRACT

A wide range straightness measuring system of the present invention accurately determines lateral and angular displacement of a probe carriage of a cartesian robot. The system includes a laser aligned with an x-axis rail of the cartesian robot system which generates a laser beam having two polarization components. A pentaprism beamsplitter is disposed on an x-axis carriage aligned with the laser. The beamsplitter orthogonally splits the laser beam into an x-axis reference beam and a y-axis reference beam. An x-axis interferometer receives the x-axis reference beam and determines a relative position value of the probe carriage measured along the x-axis. A y-axis interferometer receives the y-axis reference beam and determines a relative position value for the probe carriage measured along the y-axis. A beam monitor receives a polarized multiplexed output of the y-axis interferometer and monitors the lateral shift of the energy centroids of the beam polarization components. Both lateral and angular displacement values of the x and y-axis reference beams can be obtained by measuring the magnitude of the lateral shift.

33 Claims, 6 Drawing Sheets

WIDE RANGE STRAIGHTNESS MEASURING STEM USING A POLARIZED MULTIPLEXED INTERFEROMETER AND CENTERED SHIFT MEASUREMENT OF BEAM POLARIZATION COMPONENTS

BACKGROUND OF THE INVENTION

1. Field of the Invention

The present invention relates to position detection systems and more particularly, to a position detection system utilizing interferometric and centroid optical measuring to obtain straightness and angular measurement of payload position for a cartesian robot used in near-field antenna measurement.

2. Description of Related Art

High performance antennas are increasingly prevalent in the art as spacecraft, aircraft, ship and ground vehicle mission requirements become more sophisticated. One problem in the development and manufacture of high performance antennas is the measurement of antenna performance. Traditionally, antenna measurement was conducted by placing the antenna at a remote location, and measuring the amplitude and phase response characteristics of the antenna in its operational range. Typical operational distances for high gain antennas can range from 50 feet to 3 miles. This measurement technique, known as far-field testing, suffers from significant limitations, such as susceptibility to weather effects, ground reflections and increasing real estate costs.

As an alternative to far-field testing, near-field testing was developed. A near-field test is conducted in an indoor test range using a microwave probe to sample the field radiated near the antenna under test (AUT). A computer collects the amplitude and phase data sampled by the microwave probe, and calculates the far-field equivalent response using a Fourier transform technique.

To make accurate near-field measurements, all the significant antenna energy must be sampled by the microwave probe. Highly directive antennas, such as reflectors and waveguide phased arrays, beam most of the energy in the forward direction normal to the antenna aperture. To test these types of antennas, a planar near-field scanner is utilized. Precision cartesian robots are used to move the microwave probe along a planar pattern approximately normal to the antenna aperture. To accurately reconstruct the measured field, the probe must sample points at some minimum spacing based on the Nyquist sampling theorem. This distance is usually less than half the wavelength of the antenna signal ($\lambda/2$). Therefore, to achieve an accurate near-field measurement, the precise position of the microwave probe and its planarity with respect to the AUT is critical.

Obtaining high accuracy position information for the microwave probe has proven to be difficult to achieve. Undesired variations in the microwave probe position can occur due to flexure of the rails of the cartesian robot which support the microwave probe. One solution to this problem is to utilize an extremely rigid structure for the cartesian robot rails. For example, precision-lapped, natural-close-grained granite rails have been utilized due to their extremely rigid characteristics. The granite surface remains quite stable with time due to its natural formation and machining processes, and has a third of the thermal expansion coefficient of steel. However, the weight of such a heavy duty structure makes it increasingly difficult to provide a portable test system. Such portability can be of significant benefit to test antennas at remote locations. Moreover, the high cost of manufacturing and transporting such a heavy duty structure renders it impractical for many remote near-field test applications.

Since relatively light weight and inexpensive near-field test structures are susceptible to position errors due to flexure, an alternative to granite construction is to accept the undesired variation in microwave probe position so long as these variations can be accurately determined. Information regarding the variations to the microwave probe position can then be used in correcting the far-field equivalent response, or to manipulate the microwave probe to the correct position.

One way to provide microwave probe position information in light weight systems is to incorporate optical skeletons into the cartesian robot system. An optical skeleton utilizes laser beams which are projected collinearly with the x and y-axis rails of the robot. Accurate distance measurement can be obtained by conventional laser interferometry systems which measure changes in displacement of the microwave probe along the x and y-axes. Laser interferometers measure range by determining the phase difference between two interferometer paths.

Straightness can be measured by use of photodetectors, such as lateral effect photodiodes, which measure the relative motion of a laser beam centroid. Separate laser beams are generally utilized for straightness measurement and for distance measurement, resulting in relatively complex optical skeleton systems. Laser interferometer techniques have also been utilized to measure straightness, but these techniques further add complexity and expense.

Thus, a critical need exists to provide an accurate position and straightness measuring system for a cartesian robot which enables the use of a lightweight, portable and inexpensive near-field test system. It would be particularly desirable to take maximum advantage of known measuring technologies, while reducing the complexity and associated cost of conventional optical skeleton systems.

SUMMARY OF THE INVENTION

Accordingly, the present invention provides a synergistic combination of interferometric and centroid optical measuring technologies for use in a cartesian robot having a probe carriage carried by an x and a y-axis rail. The invention provides real-time measurement of displacement of the microwave probe as well as straightness and angular displacement of the x and y-axis rails in a relatively simple manner which is readily usable in a portable test system. Moreover, the invention provides for compensation for large straightness errors that would prevent a conventional laser interferometer from working due to laser misalignment.

The measuring system of the present invention includes a laser which generates a pair of cross-polarized laser beams having a predetermined frequency offset. The laser is aligned with the x-axis rail. A pentaprism beamsplitter is disposed on an x-axis carriage aligned with the laser. The beamsplitter splits the cross-polarized laser beam pair into an x-axis reference beam and a y-axis reference beam which are orthogonal to one another. An x-axis interferometer receives the x-axis reference beam and determines a relative position value for the probe carriage measured along the x-axis. Similarly, a y-axis interferometer receives the y-axis reference beam and determines a relative position value for the probe carriage measured along the y-axis. A beam monitor receives a polarization multiplexed output measurement of the y-axis interferometer and monitors the centroid shift of the individual laser beam components of the polarized pair. Both straightness and angular displacement of the x and y-axes can be obtained by measuring the magnitude of the lateral shift.

Alternatively, an unpolarized laser beam having both polarizations present with no frequency offset can be used in place of the cross-polarized beam. As before, the pentaprism beamsplitter splits the unpolarized laser beam into an x-axis reference beam and a y-axis reference beam which are orthogonal to one another. An x-axis interferometer receives the x-axis reference beam and determines a relative position value for the probe carriage measured along the x-axis. Similarly, a y-axis interferometer receives the y-axis reference beam and determines a relative position value for the probe carriage measured along the y-axis.

The beam monitor includes a polarization beamsplitter which splits the polarization multiplexed y-axis measurement into individual laser beam components. Each of the individual laser beam components are directed to an associated photodetector for measuring the energy centroid of the laser. A first one of the photodetectors measures lateral displacement of the x-axis reference beam, and a second one of the photodetectors measures lateral displacement of the y-axis reference beam. The measurement of the lateral displacement of the beams supplies accurate information on the probe position.

In another embodiment of the present invention, a Fourier lens is inserted in the path of the multiplexed y-axis output prior to the polarization beamsplitter of the beam monitor. The lens produces a Fourier transform of the polarization multiplexed measurement. With the Fourier lens in place, the first one of the photodetectors measures the angular displacement of the x-axis reference beam, and a second one of the photodetectors measures angular displacement of the y-axis reference beam. A motor is provided to manipulate the Fourier lens into and out of the polarization multiplexed measurement beam path. The angular displacement data is used for correction of orthogonality errors of the pentaprism beamsplitter due to inadvertent rotation about the y-axis.

In still another embodiment of the present invention, a servo system is provided to compensate for large straightness errors that would prevent the x and y-axis interferometers from working due to laser beam misalignment. In the event that extreme flexure of the y-axis rail causes the y-axis reference beam to be displaced out of alignment with the y-axis interferometer, a y-axis servo would manipulate the position of the retroreflector to compensate for the misalignment. The y-axis servo is disposed on the probe carriage. Similarly, an x-axis servo corrects for x-axis reference beam misalignment with the x-axis interferometer by rotating an optical block disposed in the path between the laser and the pentaprism beamsplitter. The optical block is disposed on the x-axis carriage.

A more complete understanding of the straightness measurement system for a polarized multiplexed interferometer will be afforded to those skilled in the art, as well as a realization of additional advantages and objects thereof, by a consideration of the following detailed description of the preferred embodiment. Reference will be made to the appended sheets of drawings which will be first described briefly.

DETAILED DESCRIPTION OF THE PREFERRED EMBODIMENT

Figure 1:
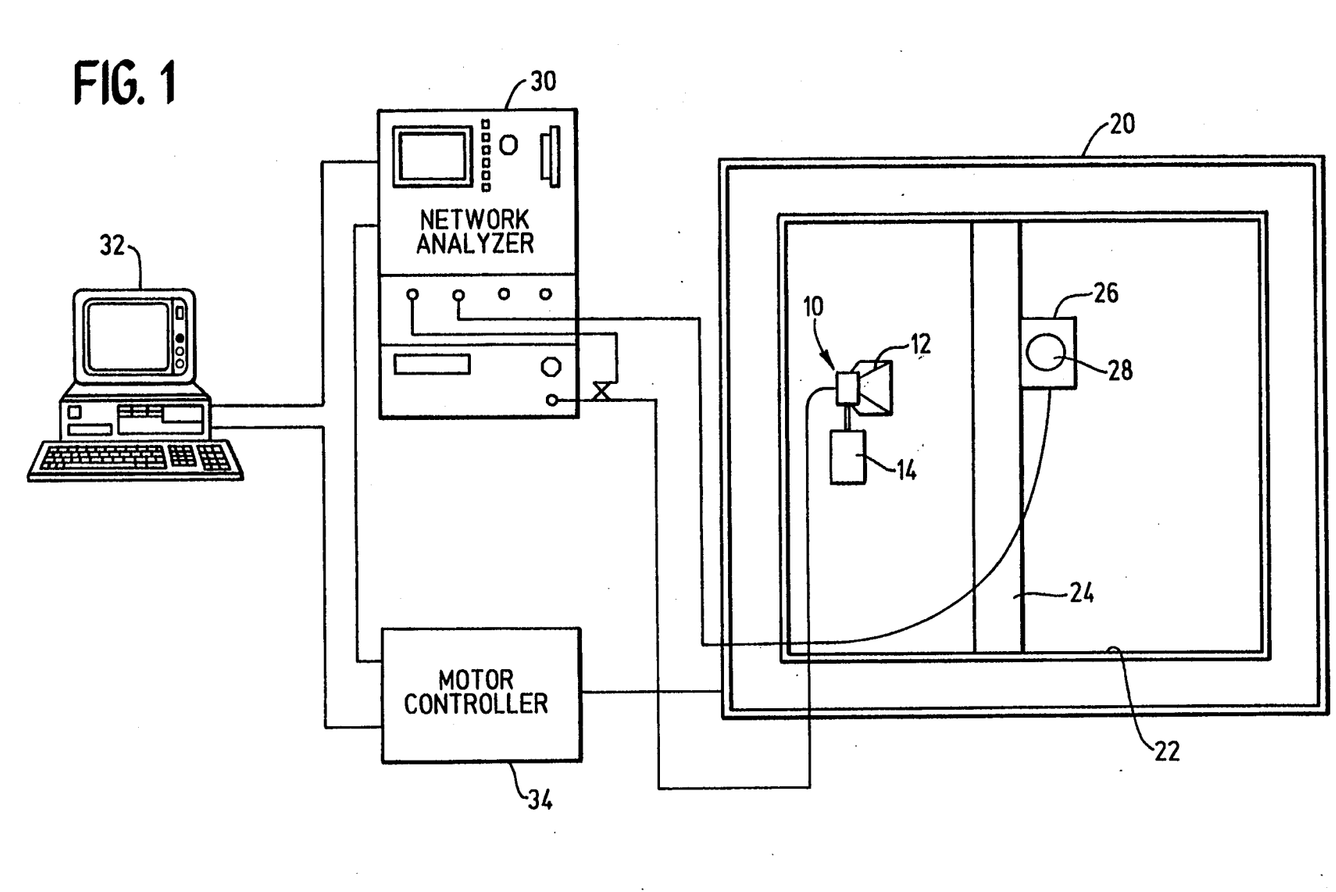
FIG. 1 illustrates a near-field antenna measurement system.

Referring first to FIG. 1, a near-field antenna measurement system is illustrated. The antenna under test (AUT) 10 is secured to a test stand 14 and faces a cartesian robot 20. The AUT 10 has a feedhorn 12 which directs power from an aperture of the AUT.

The plane of the cartesian robot 20 is defined by an x-axis rail 22 which is orthogonal to a y-axis rail 24. The y-axis rail 24 is capable of horizontal movement along the length of the x-axis rail 22. A probe carriage 26 is provided on the y-axis rail, and is capable of vertical movement along the length of the rail. A microwave probe 28 extends from the probe carriage 26 normal to the plane formed by the robot 20. To obtain an accurate near-field measurement of the AUT, the movement of the probe 28 must be perfectly planar.

To operate the near-field test system, the microwave probe is moved in a repeatable pattern relative to the stationery AUT 10 to sample amplitude and phase data emitted by the AUT. A network analyzer 30 receives and compiles the data received by the probe. A motor controller 34 controls the position of the probe carriage 26 as it moves along the sample points. A computer 32 controls the entire operation of the system and produces the far-field equivalent transformation of the data.

Figure 2:
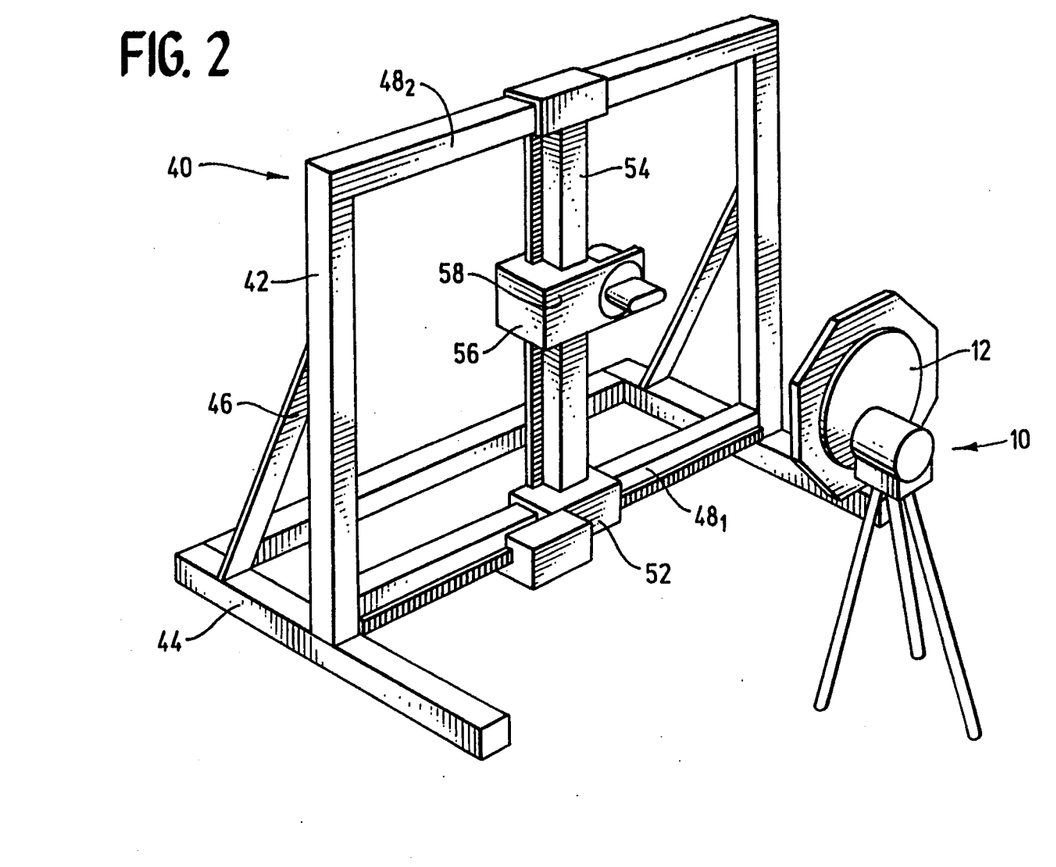
FIG. 2 is a perspective view of a cartesian robot used in a near-field test system.

An exemplary cartesian robot is illustrated in greater detail in FIG. 2. The robot 40 has a frame 42 with a generally rectangular base 44. An angle brace member 46 provides additional stiffness for the frame 42. It is intended that the robot construction be rigid enough to withstand ordinary vibration, yet also be lightweight enough to be portable and cost effective. X-axis rails $48_1$ and $48_2$ are disposed horizontally along the width of the robot 40, at an upper and a lower portion thereof. An x-axis carriage 52 interconnects the y-axis rail 54 with the x-axis rail $48_1$. The x-axis carriage 52 is mobile along the x-axis rail $48_1$, and forms a lower portion of the y-axis rail 54. The y-axis rail 54 extends vertically between the x-axis rails $48_1$ and $48_2$. A probe carriage 56 is disposed on the y-axis rail 54, and has an exposed mounting surface 58. The probe carriage 56 can be manipulated along the y-axis rail 54, and the y-axis rail can be manipulated along the x-axis rails $48_1$ and $48_2$. Thus, the probe carriage 56 can be positioned at any point along the planar surface of the robot 40.

As known in the art, movement of the y-axis rail 54 and the probe carriage 56 is controlled with precision motors (not shown). These motors can either be disposed within the x-axis carriage 52 and the probe carriage 56, or can be positioned at an end of the x-axis rails with movement controlled by threaded linkages. The rails 54 and 48 may additionally have teeth which can mesh with gears operated by the motors. Other methods of accurately manipulating the probe carriage 56 and the y-axis rail 54, such as a conventional rack and pinion system, cables, wheels or threaded shafts, can be advantageously utilized within the spirit of the present invention.

Figure 3:
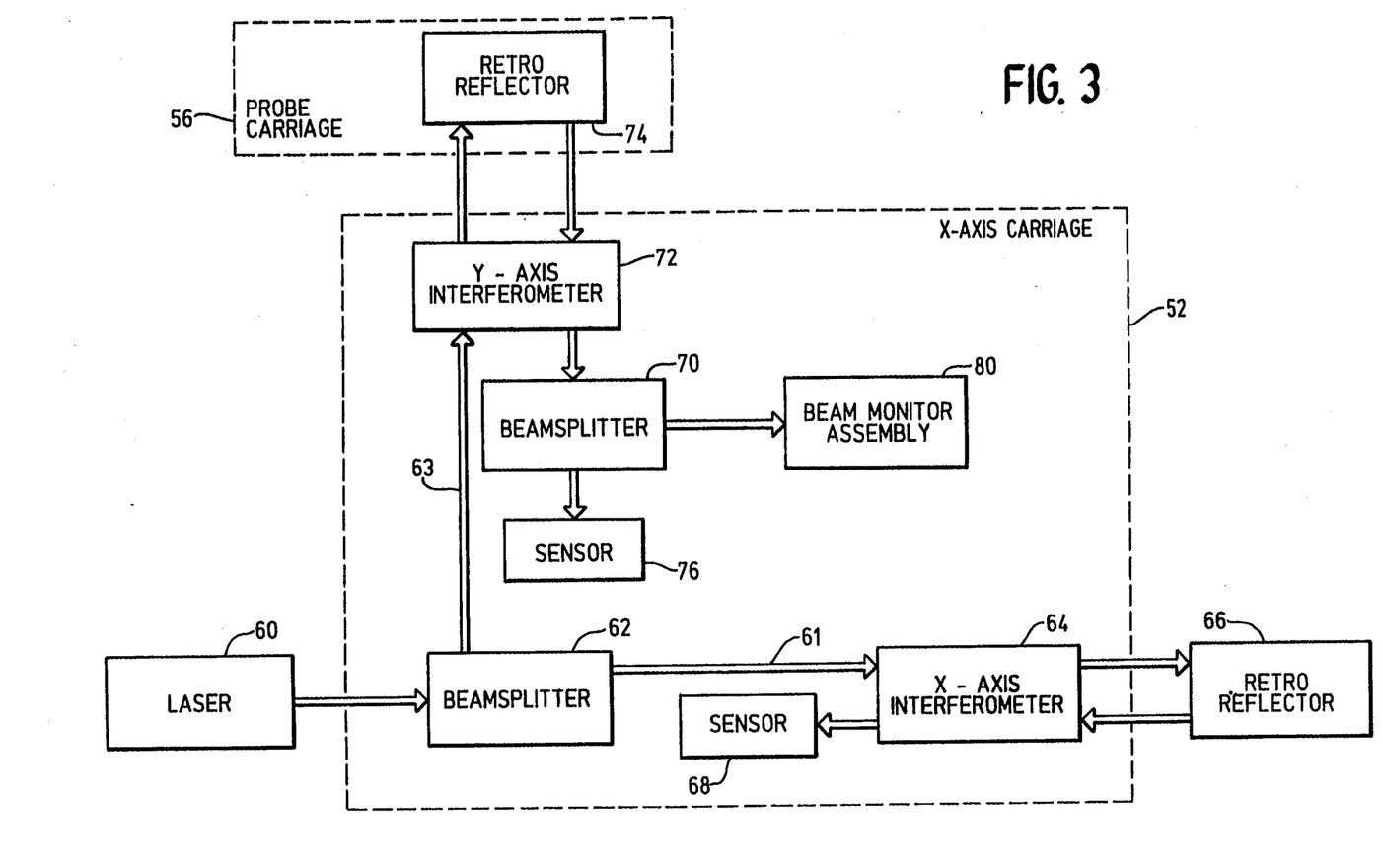
FIG. 3 is a block diagram illustrating a straightness measuring system of the present invention.

A laser 60 is disposed adjacent the robot 40 and produces a pair of cross-polarized laser beams in a direction approximately parallel to the lower x-axis rail $48_1$. The cross-polarized beams have a frequency offset of approximately 2.4 to 3.0 MHz. The frequency offset between the two polarization components is used to resolve the direction of motion in the interferometer measurement, which will be further described below. In the preferred embodiment, a Hewlett-Packard Model No. HP 5517C laser is utilized.

The cross-polarized beams first contact a pentaprism type beamsplitter 62 mounted on the x-axis carriage 52. The beamsplitter 62 splits the cross-polarized beams into an x-axis reference beam 61 and a y-axis reference beam 63. These reference beams provide a standard of orthogonality which the x and y-axis rails can be measured against. To provide a desired level of accuracy, the beamsplitter 62 should be capable of maintaining the paths of the reference beams orthogonal to within a 2.5 arc second tolerance.

A known problem with commercially available pentaprism or pentamirror beamsplitters is that of orthogonality errors due to rotation of the beamsplitter. Rotation of the beamsplitter about the axis normal to the image plane will cause loss of orthogonality between the target and image beams. In particular, rotation of the beamsplitter 62 about the y-axis will cause orthogonality errors between the x-axis reference beam 61 and the y-axis reference beam 63. Correction for this error will be further discussed below.

The x-axis reference beam 61 is approximately collinear with the lower x-axis rail $48_1$, and passes through a distance measuring interferometer 64. The distance measuring interferometer 64 measures a change in pathlength distance between the interferometer disposed on the x-axis carriage 52, and a stationary point at an end of the x-axis rail $48_1$. A retroreflector 66 is disposed at the end of the x-axis rail $48_1$, and provides a fixed reference point for measurement of displacement of the x-axis carriage 52 along the x-axis. As known in the art, a retroreflector reflects light back in the same direction as its source. In the preferred embodiment, a commercially available retroreflector, such as the Hewlett-Packard Model No. HP 10704A is utilized.

Figure 4:
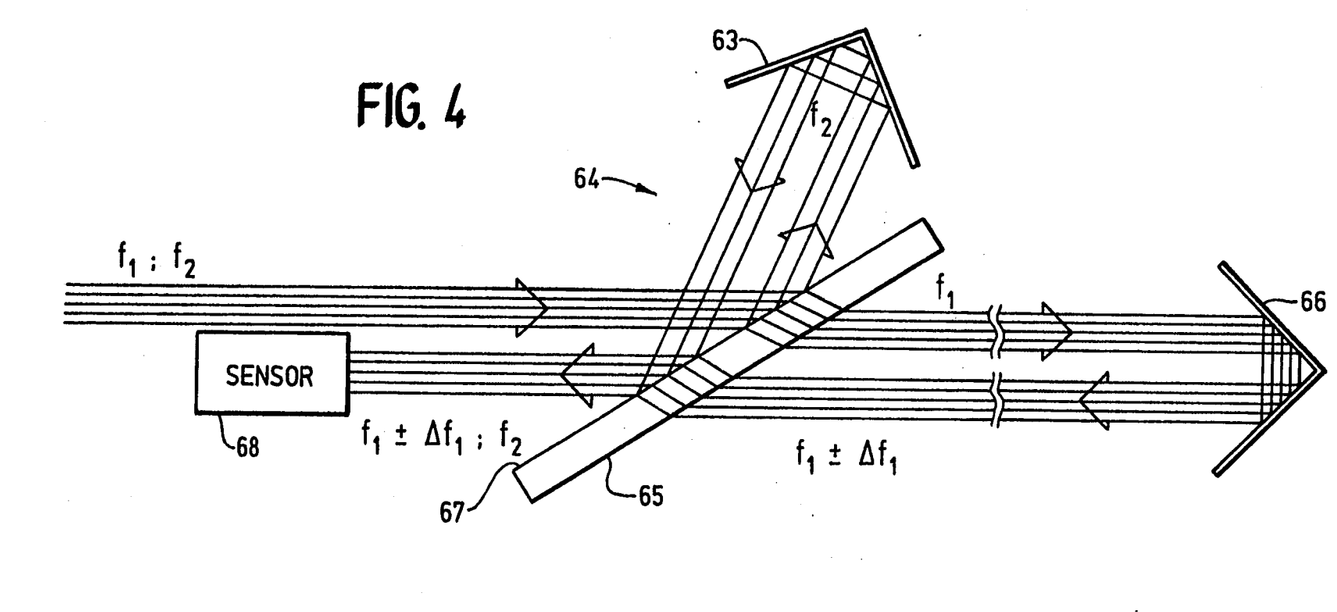
FIG. 4 is a block diagram illustrating the laser interferometer used in the straightness measuring system.

The interferometer 64 includes an internal polarization beamsplitter comprising a glass plate 65 and a retroreflector 63. As illustrated in FIG. 4, the glass plate 65 has a surface coating 67 which separates the x-axis reference beam into its two polarization components. The first x-axis reference beam component having a frequency $f_1$ passes through the beamsplitter 65 and reflects off the retroreflector 66. The reflected beam component then returns to the interferometer 64. The second x-axis reference beam component having a frequency $f_2$ reflects off the internal retroreflector 63 within the interferometer 64, and combines with the first beam component which has returned from the retroreflector 66.

The angle in which the glass plate 65 is disposed with respect to the x-axis reference beam path is known as the Brewster angle, and is dependent upon the surface coating 67 applied to the glass plate. In the preferred embodiment, the glass plate 65 is formed from optical quality glass having a high degree of smoothness, and is disposed at a 57 degree angle with respect to the x-axis reference beam path. The interferometer 64 is capable of transmitting the first x-axis reference beam component with a deviation of approximately 2 arcseconds.

The combined beam forms a polarized multiplexed output which represents a measurement of change in the pathlength difference between the x-axis carriage 52 and the stationery retroreflector 66 at the far end of the x-axis rail. A doppler receiver 68 converts the polarized multiplexed output into an amplitude modulated signal. The receiver 68 has an internal photodiode which converts the amplitude modulated signal to an electrical signal that can be amplified and sent to the computer 32 for processing.

The operation of the y-axis reference beam 63 is similar to that of the x-axis reference beam 61. The y-axis reference beam 63 similarly passes through a y-axis distance measuring interferometer 72 disposed on the x-axis carriage 52. The y-axis interferometer 72 has an internal polarization beamsplitter identical to that described above with respect to the x-axis interferometer 64. The internal polarization beamsplitter divides the y-axis reference beam into its polarization beam components ($f_1$ and $f_2$). A first y-axis polarization beam component $f_1$ passes through the interferometer 72 and reflects off of a retroreflector 74 which is disposed on the probe carriage 56. The reflected y-axis reference beam component returns to the interferometer 72 and combines with the second y-axis reference beam component $f_2$ which has been internally reflected by the retroreflector within the interferometer 72.

Like the x-axis reference beam, the y-axis interferometer 72 forms a polarized multiplexed measurement of change in the pathlength difference between the retroreflector 74 on the probe carriage 56 and the interferometer 72 on the x-axis carriage 52. A doppler receiver 76 receives the polarized multiplexed output and converts it into an amplitude modulated signal, as described above. Accordingly, the data received from the x-axis doppler receiver 68 and the y-axis doppler receiver 76 provides relative position information concerning the probe carriage 56 to the computer 32.

To obtain straightness measurement data, an additional beamsplitter 70 is disposed between the y-axis interferometer 72 and the doppler receiver 76. The beamsplitter 70 directs a portion 71 of the polarized multiplexed output of the y-axis interferometer 72 to a beam monitor assembly 80 disposed on the x-axis carriage 52. The beam monitor assembly 80 is illustrated in greater detail in FIG. 5. The polarized multiplexed output portion 71 is directed to a polarization beamsplitter 82, which splits the beam into its component frequency elements 83 and 85. Each of the component elements 83 and 85 travel to separate position sensing photodetectors 84 and 86, respectively.

Figures 5, 6:
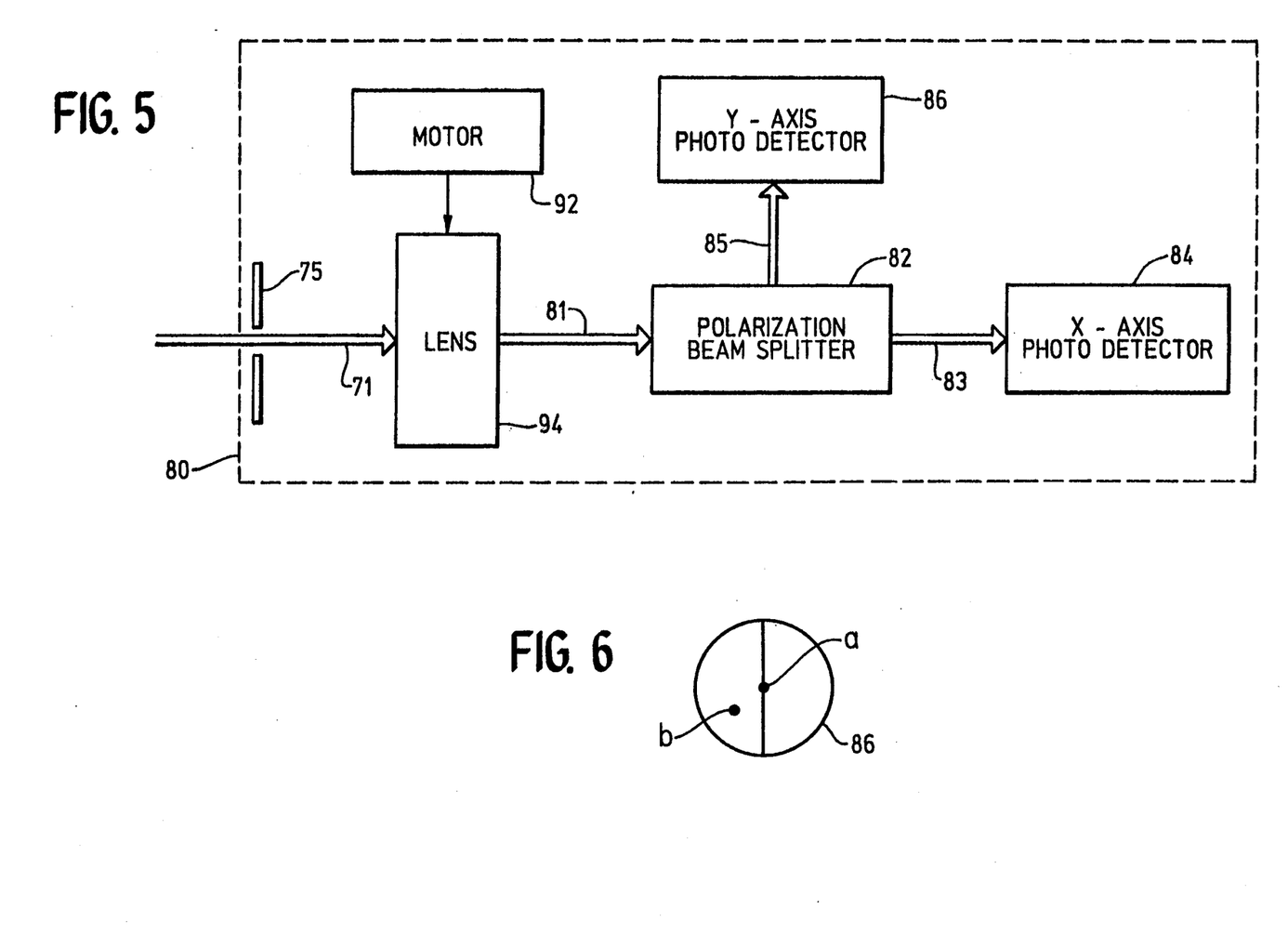
FIG. 5 is a block diagram illustrating a beam monitor assembly of the present invention.
FIG. 6 is a front view of a photodetector receiving an exemplary laser beam to perform an energy centroid measurement.

The photodetectors 84 and 86 provide a centroid measurement of the rail straightness. The photodetectors can be provided by conventional two-axis lateral effect photodiodes formed from a semiconductor material which produces electrical current based upon the energy centroid of a laser. Alternatively, the photodetectors could be provided by a charge coupled device (CCD) type detectors, which could be configured to provide similar energy centroid data. Moreover, either a one-dimensional or two-dimensional photodetector could be advantageously used.

As illustrated in FIG. 6 with respect to photodetector 86, if the energy centroid of the laser is positioned at the center spot marked a, the beam is perfectly aligned with the photodetector and there is no rail displacement. However, if the energy centroid of the beam is displaced away from the center, such as at the spot marked b, then there is rail displacement. The distance from the center of the photodetector in which the beam is displaced is linearly related to the rail displacement, and can be measured by the photodetector in relation to its output current. In the preferred embodiment, a commercially available photodetector, such as manufactured by United Detector Technology, is utilized.

Vertical displacement of the beamsplitter 62 corresponds to change of position of the x-axis carriage 52 due to flexing of the x-axis rails $48_1$ and $48_2$ relative to the x-axis. The magnitude of this displacement is measurable as lateral displacement of the first beam component 83. Similarly, horizontal displacement of the retroreflector 74 corresponds to change of position of the probe carriage 56 due to flexing of the y-axis rail 54 relative to the y-axis. The magnitude of this displacement is measurable as lateral displacement of the second beam component 85. The actual displacement data measured by the photodetector 86 comprises the sum of the flexing of the x-axis rails $48_1$ and $48_2$ and the y-axis rail 54. The x-axis displacement magnitude measured by photodetector 84 is subtracted from the sum data measured by photodetector 86 to determine the y-axis displacement magnitude. It should be apparent that the same laser beam which provides distance measurement by use of the interferometers 64 and 72 provides the straightness information by the addition of the beam monitor assembly 80, eliminating the need for separate beams to provide this information.

In an embodiment of the present invention, the multiplexed output portion 71 of the y-axis beam would pass first through an entrance aperture 75 disposed at an entrance of the beam monitor assembly 80. The aperture 75 suppresses stray light that could otherwise upset the centroid measurements of the photodetectors 84 and 86.

To obtain angular displacement information concerning the probe carriage 56 position, a Fourier lens 94 can be placed in the path of the multiplexed y-axis beam portion 71 directed to the beam monitor assembly 80. The Fourier lens 94 performs a Fourier transform of the multiplexed beam, producing the transformed beam 81 having an angular spectrum. By conducting the Fourier transform, the centroid measurement described above with respect to the photodetectors 84 and 86 now represents angular displacement of the probe carriage 56, rather than lateral displacement. In particular, the magnitude of the angular displacement of the probe carriage 56 relative to the x-axis is measurable as lateral displacement of the first beam component 83, and the magnitude of the angular displacement of the probe carriage 56 relative to the y-axis is measurable as lateral displacement of the second beam component 85. For example, using a Fourier lens focal length of 57.3 millimeters, 1 millimeter of beam displacement measured at the photodiodes 84 and 86 would correspond to 1 degree of rotation of the probe carriage 56. In addition angular displacement of the y-axis beam due to rotation of the beamsplitter 62 about the y-axis can be accurately measured. This way, an accurate determination of the orthogonality of the x and y-axis beams can be obtained.

Alternatively, the polarization beamsplitter 82 can be configured within the beam monitor assembly 80 to be selectively turned to change the emitted polarization component. This would allow the use of only a single photodetector 84 to receive both x and y-axis data. While in a first position, the photodetector would measure x-axis lateral and angular displacement, and in a second position, the photodetector would measure y-axis lateral and angular displacement. The operator can selectively move the polarization beamsplitter 82 between the two positions.

In the event that the error in rail straightness is excessive, optical interference may no longer occur at the y-axis doppler receiver 76. This is because the first y-axis beam component $f_1$ will be translated laterally far enough that it will no longer sufficiently overlap the second beam component $f_2$. Without the additive interference, the doppler receiver 76 will be unable to measure distance. In order for the doppler receiver 76 to function properly, there must be at least 50% overlap between the first and second beam components.

Figure 7:
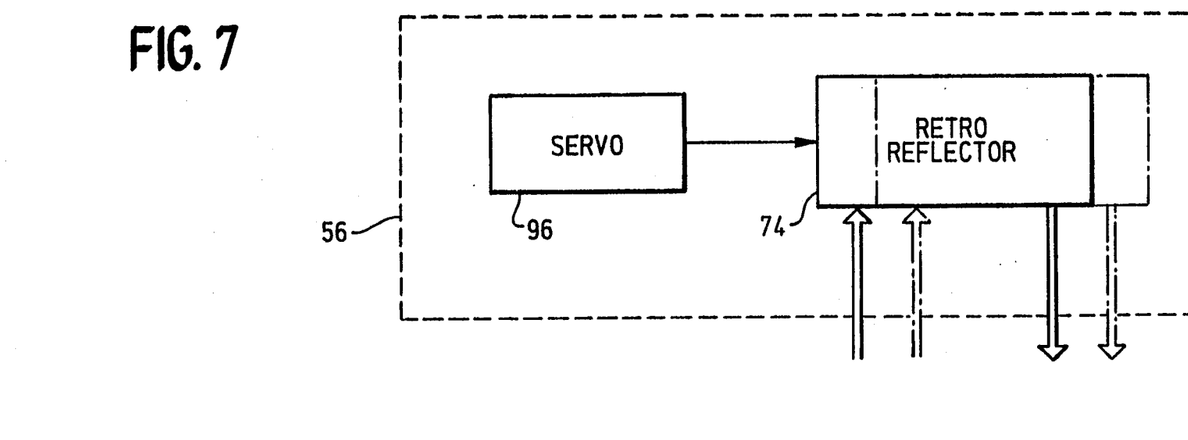
FIG. 7 is a block diagram of an alternative embodiment of the present invention illustrating a compensation servo for the y-axis reference beam.

Since the beam monitor assembly 80 provides centroid measurements of the y-axis beam components, the centroid information can also be used to control a servo to realign the beam. The straightness error in the y-axis direction can be corrected by changing the lateral position of the retroreflector 74 disposed on the probe carriage 56. As illustrated in FIG. 7, a servo 96 can shift the lateral position of the retroreflector 74 to realign the first beam component $f_1$ with the second beam component $f_2$. The figure shows the retroreflector 74 and the first beam component $f_1$ shifted to a corrected position shown in phantom. Information concerning the magnitude of the lateral shift produced by the servo can be provided to the computer 32, which would adjust the probe position data accordingly.

Figure 8:
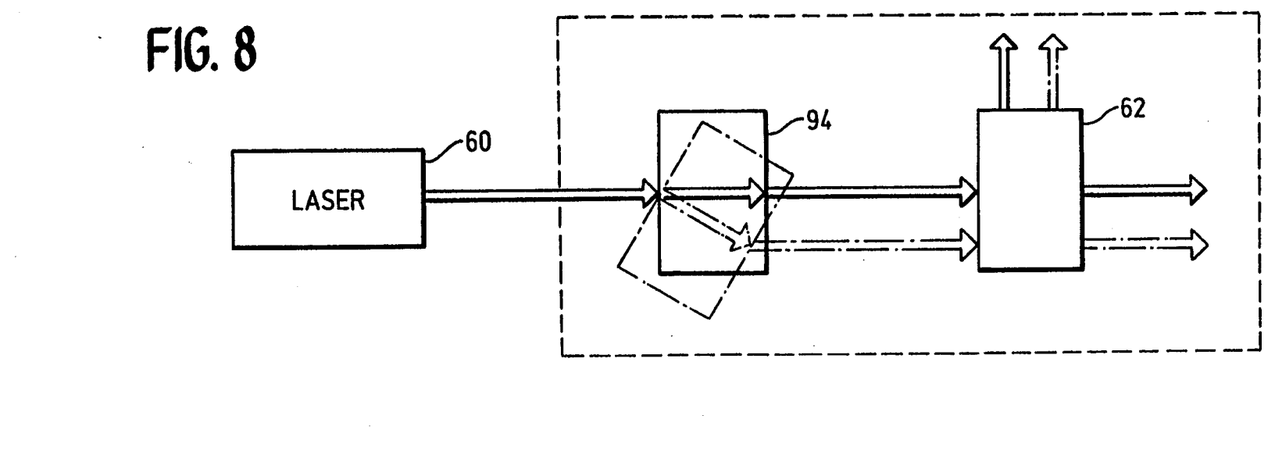
FIG. 8 is a block diagram of an alternative embodiment of the present invention illustrating a compensation servo for the x-axis reference beam.

Similarly, errors in the x-axis direction can cause failure of the x-axis distance measuring interferometer 64. These errors can be corrected by placing a two-axis rotational glass block 94 in the path between the laser 60 and the pentamirror 62. Rotation of the block 94 under servo control can alter the direction of the cross polarized beam into the pentamirror 62, as illustrated in FIG. 8. The figure shows the block 94 and the x-axis reference beam shifted to a corrected position shown in phantom. As above, information concerning the magnitude of the lateral shift produced by the servo can be provided to the computer 32, which would adjust the probe position data accordingly.

Under most circumstances, the flexure variations of the x and y-axis rails are generally repeatable as the probe carriage 56 retraces its path. This enables the construction of a lookup table stored within the computer 32 based on the position data received from the beam monitor assembly 80. The lookup table defines the errors of the particular robot 40, and can be used to correct the sample data received by the microwave probe 28. As changes to the lookup table data are measured by the beam monitor assembly 80, the table can be routinely updated. An alternative approach is to utilize filters or algorithms which describe the flexure variations of the rails, with the actual position data utilized to update the parameters of the filters or algorithms. The lookup table can further be used to control the manipulation and operation of the cartesian robot 40, to provide that the probe 28 is manipulated to the correct position relative to the AUT 10.

In an alternative embodiment of the invention, an unpolarized laser beam having both horizontal and vertical polarization components with no frequency offset (i.e. $f_1$ equal to $f_2$) can be used in place of the cross-polarized beam described above. As before, the pentaprism beamsplitter 62 splits the unpolarized laser beam into an x-axis reference beam and a y-axis reference beam which are orthogonal to one another. The use of the unpolarized beam would not change operation of the beam monitor assembly 80 in measuring straightness or angular displacement. However, the doppler receivers 68 and 76 would require modification to receive the polarization multiplexed signal without the frequency offset and produce an amplitude modulated signal representing the change in displacement.

Having thus described a preferred embodiment of a wide range straightness measuring system using a polarized interferometer, it should now be apparent to those skilled in the art that the advantages of the within system have been achieved. The present invention has demonstrated a synergistic combination of interferometric and centroid optical measuring technologies to obtain both straightness and angular measurements, as well as distance measurement. Large straightness errors can be compensated for which would previously have prevented conventional distance measuring interferometers from working properly.

It should also be appreciated by those skilled in the art that various modifications, adaptations, and alternative embodiments thereof may be made within the scope and spirit of the present invention. For example, alternative components can be substituted as necessary to produce differing levels of measurement accuracy. In addition, it should be apparent that the straightness and angular displacement measurement system could be applied to a wide assortment of applications requiring precise measurement of a payload position in a cartesian plane. The invention is further defined by the following claims.

What is claimed is:

1. A straightness measurement system for a cartesian robot having a probe carriage, the system comprising:
   laser means for generating a laser beam having two polarization components;
   beamsplitter means for splitting said laser beam into an x-axis reference beam and an orthogonal y-axis reference beam;
   interferometer means for forming a measurement of change in pathlength of said y-axis reference beam relative to said probe carriage; and
   monitoring means for monitoring centroid shift of said two polarization components of said measurement, wherein said centroid shift corresponds to a misalignment of said probe carriage.

2. The straightness measurement system of claim 1, wherein said monitoring means further comprises:
   a polarizer splitting said measurement into said polarization components;
   a first centroid measuring means for receiving a first one of said polarization components and determining lateral displacement of said x-axis reference beam; and
   a second centroid measuring means for receiving a second one of said polarization components and determining lateral displacement of said y-axis reference beam.

3. The straightness measurement system of claim 2, wherein said monitoring means further comprises:
   a lens and means for moving said lens into the path of said measurement prior to said polarizer, said lens performing a Fourier transform of said measurement, said first centroid measuring means determining angular displacement of said x-axis reference beam and said second centroid measuring means determining angular displacement of said y-axis reference beam when said lens is moved into said path.

4. The straightness measurement system of claim 1, further comprising:
   servo means responsive to said monitoring means for maintaining said y-axis reference beam in alignment with said interferometer means.

5. A straightness measurement system for a cartesian robot having a probe carriage carried by generally orthogonal rails, the system comprising:
   a laser generating a laser beam having two polarization components;
   means for splitting said laser beam into an x-axis reference beam and a y-axis reference beam substantially orthogonal to said x-axis reference beam;
   first measuring means for receiving said y-axis reference beam and providing a first measurement of change in pathlength of said y-axis reference beam relative to said probe carriage; and
   monitoring means for determining straightness of said rails by monitoring centroid shift of said two polarization components of said first measurement.

6. The straightness measurement system of claim 5, wherein said first measuring means further comprises:
   a first retroreflector disposed on said probe carriage collinearly reflecting a first one of said polarization components;
   a first interferometer means for combining a second one of said polarization components with said collinearly reflected first polarization component to produce said first measurement; and
   a first receiver converting said first measurement into an amplitude modulated signal.

7. The straightness measurement system of claim 5, wherein said monitoring means further comprises:
   a polarizer splitting said first measurement into said polarization components;
   a first photodetector receiving a first one of said polarization components, and a second photodetector receiving a second one of said polarization components, said first photodetector determining lateral displacement of said x-axis reference beam, and said second photodetector determining lateral displacement of said y-axis reference beam.

8. The straightness measurement system of claim 5, wherein said monitoring means further comprises:
   transform means for selectively performing a Fourier transform of said first measurement;
   a polarizer splitting said transformed first measurement into said polarization components;

a first photodetector receiving a first one of said polarization components and determining angular displacement of said x-axis reference beam; and a second photodetector receiving a second one of said polarization components and determining angular displacement of said y-axis reference beam.

9. The straightness measurement system of claim 5, further comprising:

servo means responsive to said monitoring means for maintaining said first measurement aligned with said first measuring means.

10. The straightness measurement system of claim 6, wherein said first interferometer means comprises:

a housing having a plurality of optical ports to permit laser transmission therethrough;

an optical glass plate disposed within said housing at a predetermined angle with respect to said y-axis reference beam, said plate having a polarization reflective coating which reflects said second polarization component; and a retroreflector secured to said housing and collinearly reflecting said reflected second polarization component back to said plate.

11. The straightness measurement system of claim 10, wherein said predetermined angle is the Brewster angle of said second polarization component.

12. The straightness measurement system of claim 5, further comprising:

second measuring means for receiving said x-axis reference beam and providing a second polarization multiplexed measurement of change in pathlength of said x-axis reference beam relative to an end of an x-axis rail.

13. The straightness measurement system of claim 12, wherein said second measuring means further comprises:

a second retroreflector disposed on said end of said x-axis rail and collinearly reflecting a first one of said polarization components;

a second interferometer means for combining a second one of said polarization components with said collinearly reflected first polarization component to produce said second measurement; and a second receiver converting said second measurement into an amplitude modulated signal.

14. The straightness measurement system of claim 13, wherein said second interferometer means comprises:

a housing having a plurality of optical ports to permit laser transmission therethrough;

an optical glass plate disposed within said housing at a predetermined angle with respect to said y-axis reference beam, said plate having a polarization reflective coating which reflects said second polarization component; and a retroreflector secured to said housing and collinearly reflecting said reflected second polarization component back to said plate.

15. The straightness measurement system of claim 5, further comprising:

computer means responsive to said monitoring means for determining position of said probe carriage.

16. The straightness measurement system of claim 15, wherein said computer means further comprises a lookup table.

17. The straightness measurement system of claim 15, wherein said computer means further comprises means responsive to said monitoring means for correcting position of said probe carriage.

18. The straightness measurement system of claim 5, wherein said laser beam comprises two cross-polarized beams having a predetermined frequency offset.

19. A straightness measurement system for a cartesian position system having a probe carriage carried by an x-axis rail and a y-axis rail, the system comprising:

laser means for generating a laser beam having two polarization components;

beamsplitter means for splitting said laser beam into an x-axis reference beam and a y-axis reference beam substantially orthogonal to said x-axis reference beam;

first interferometer means for forming a first measurement of change in pathlength of said y-axis reference beam relative to said probe carriage;

second interferometer means for forming a second measurement of change in pathlength of said x-axis reference beam relative to an end of said x-axis rail; and monitoring means for monitoring lateral displacement of said x and y-axis reference beams by measuring centroid shift of said first measurement.

20. The straightness measurement system of claim 19, wherein said beamsplitter means comprises a pentaprism.

21. The straightness measurement system of claim 19, wherein said monitoring means further comprises:

a polarizer splitting said first measurement into said polarization components;

a first centroid measuring means for receiving a first one of said polarization components and determining lateral displacement of said y-axis reference beam; and a second centroid measuring means for receiving a second one of said polarization components and determining lateral displacement of said x-axis reference beam.

22. The straightness measurement system of claim 21, wherein said monitoring means further comprises:

a lens and means for moving said lens into the path of said first measurement prior to said polarizer, said lens performing a Fourier transform of said first measurement;

wherein said first centroid measuring means determining angular displacement of said y-axis reference beam, and said second centroid measuring means determining angular displacement of said x-axis reference beam with said lens moved into said path.

23. The straightness measurement system of claim 22, wherein said moving means comprises a motor.

24. The straightness measurement system of claim 19, further comprising:

first servo means responsive to said monitor means for maintaining said y-axis reference beam in substantial alignment with said first interferometer means.

25. The straightness measurement system of claim 24, further comprising:

second servo means responsive to said monitor means for maintaining said x-axis reference beam in substantial alignment with said second interferometer meads.

26. The straightness measurement system of claim 19, wherein said monitoring means further comprises:

a polarizer selectively transmitting a desired one of said first measurement polarization components; and a centroid measuring means for receiving said desired polarization component and determining lateral displacement of an associated one of said x-axis and y-axis reference beams corresponding with said desired polarization component.

27. A position measurement system for a cartesian robot having a probe carriage, the system comprising:

laser means for generating a reference laser beam having two polarization components, a first one of said polarization components being collinearly reflected from said probe carriage;

interferometer means for combining a second one of said polarization components with said reflected first component to produce a measurement of change in pathlength of said reference beam relative to said probe carriage, said interferometer means comprising a housing, an optical glass plate disposed within said housing at a predetermined angle with respect to said reference beam, said plate having a reflective coating which reflects said second component, and a retroreflector secured to said housing and collinearly reflecting said reflected second component back to said plate for combination with said reflected first component; and measuring means for measuring centroid shift of said measurement of change in pathlength.

28. The position measurement system of claim 27, wherein said interferometer means is disposed between said laser means and said probe carriage.

29. The straightness measurement system of claim 27, wherein said predetermined angle is the Brewster angle of said second component.

30. A method for measuring position of a probe carriage of a cartesian position system, the method comprising:

generating a laser beam having two polarization components;

splitting said laser beam into an x-axis reference beam and a y-axis reference beam orthogonal to said x-axis reference beam;

forming a measurement of change in pathlength of said y-axis reference beam relative to said probe carriage;

splitting said measurement into said two polarization components; and measuring centroid shift of said two polarization components to determine position of said probe carriage.

31. The method for measuring position of claim 30, further comprising the steps of:

performing a Fourier transform of said measurement; and monitoring centroid shift of the Fourier transform of said polarization components to determine angular displacement of said probe carriage.

32. The method for measuring position of claim 30, further comprising the step of:

maintaining alignment of said y-axis reference beam in response to said measured centroid shift.

33. The method for measuring position of claim 30, further comprising the step of:

correcting position of said probe carriage responsive to said measurement of centroid shift.

* * * * *